Sept. 10, 1940.  M. D. WALKLET  2,214,514
AUTOMOBILE BUMPER CONSTRUCTION
Filed Dec. 2, 1938
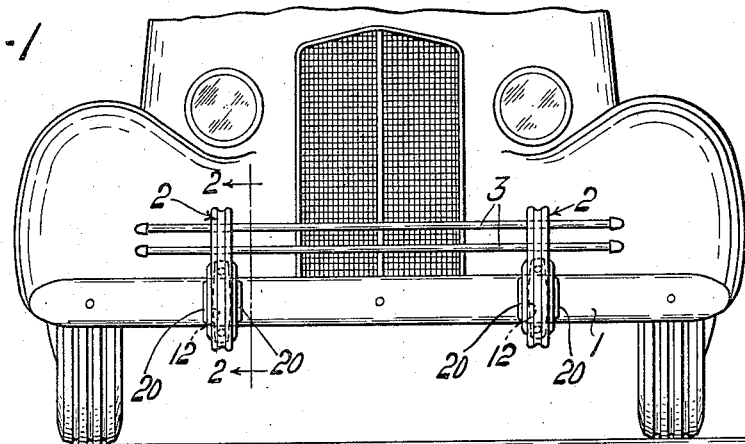
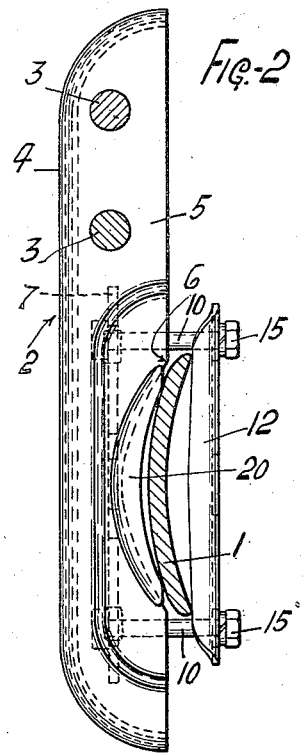
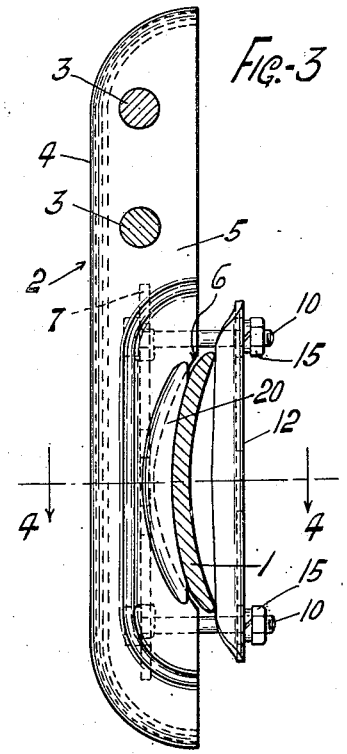
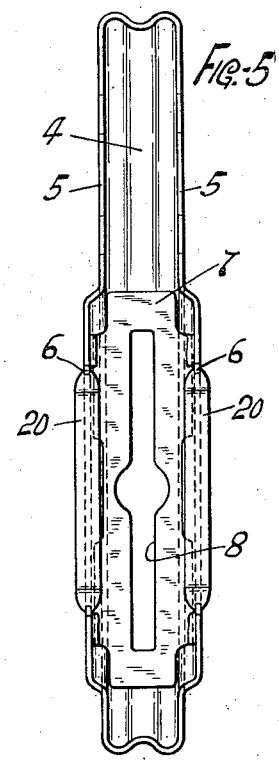
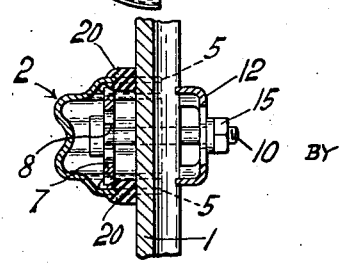
INVENTOR
MERCER D. WALKLET
ATTORNEYS Patented Sept. 10, 1940

2,214,514

UNITED STATES PATENT OFFICE 2,214,514

AUTOMOBILE BUMPER CONSTRUCTION

Mercer D. Walklet, Akron, Ohio, assignor, by mesne assignments, to American Chain & Cable Company, Inc., a corporation of New York Application December 2, 1938, Serial No. 243,572

7 Claims. (Cl. 293—55)

The present invention relates to the construction of bumpers and bumper guards such as commonly used on the front and rear of automobiles. Specifically, the invention has to do with a new and improved form of transverse bumper attachment known generally as a bumper guard and the means for attaching it to the usual horizontal bumper. Guards are usually attached to the main bumper by clamps of various types, and as the horizontal element or bumper proper is generally rounded in cross section, the portion of the guard in contact with the bumper is shaped to fit the contour of the bumper. As many variations in the exact contour of the bumper are found in commercial devices, it has heretofore been necessary to provide a corresponding variety of formations in the guard, if a close and accurate fit is desired. If the guard does not fit accurately it will be unsightly and tend to work loose and rattle.

The variations in bumper contours is especially troublesome to accessory dealers who furnish devices of this type to the automobile user, and the dealers have been required to carry a large supply in order to meet the possible demands for close fitting bumper guards.

It is the purpose of the invention to provide a simple and very effective combination of guard and adapter which will fit the standard bumper guard and will be yielding or elastic so that it will conform to the contour of a wide range of different bumper contours. In the form of the invention shown the adapter is made of a yielding material, preferably as a rubber strip or channel adapted to have an edge fit on the rearwardly turned flanges of the guard and to contact and shape itself to the bumper as the securing means is drawn up. While this is the preferred form, other and different modifications of the invention may be utilized in specific adaptations of the invention.

The advantages of the device not only reside in the ability to adapt a standard form of guard to a large range of bumpers, and to thereby reduce the stock which the dealer should carry, but it also prevents vibration rattles, fills any gap between the bumper and the bar and protects the polished surface of the bumper, which reduces the tendency to rusting. The adapter also absorbs many of the shocks and blows received by the guard. The adapter is inexpensive and easy to apply and has many other advantages over prior devices. Adapters of other types have been suggested, but none offer the many advantages of the present invention.

In the form of the invention shown and described a specific form of dual guard is illustrated, but it will be understood that the invention is not limited to this type, but may be extended to other forms.

Of the accompanying drawing:

Figure 1 is a front view of an automobile with the improved bumper guard construction applied to a specific type of guard;

Figure 2 is an enlarged cross section of one of the bumper guards showing it in position with the securing means adjusted but not tightened;

Figure 3 is a similar view with the securing means tightened fully showing the manner in which the adapter conforms itself to the guard and the bumper;

Figure 4 is a section on the line 4—4 of Fig. 3; and

Figure 5 is a view looking into the rear of a guard removed from the bumper, but with the adapter in place.

In the drawing, the horizontal or main bumper attached to the front of an automobile is shown at 1. Vertical transverse bumper guards are shown at 2, being connected, in the form shown, by two horizontal rods 3. It will be appreciated that this form of guard is merely illustrative, as the guards may be of any design.

The bumper guards in the form shown are metal stampings formed with the central front web 4 and the rearwardly extending flanges 5 which are cut away as shown at 6 in arc-shaped recesses to fit approximately a standard contour of bumper. As explained, the bumpers which are found on the market may have divergent contours and it is the intention to form the recesses 6 to approximate shape and dimensions to fit a given bumper. While the guards may be of the flanged type shown, in the broader aspects of the invention they may be solid or of any desired construction, and while the cut away recess is usual, the surface of the guard will be shaped in its bumper contacting region in general conformity with the contour of the bumper.

Seated within the space at the rear of the guard in the form shown, is a plate 7, provided with the vertical slot 8, having a locally enlarged portion to receive the upper and lower securing bolts 10 so that the heads are retained by the narrow slotted area. These bolts are received in the cross plate 12 at the rear of the bumper so that when the nuts 15 are tightened the guard is forced into secure fitted relation to the bumper.

The adapters referred to are shown as generally arc-shaped rubber strips or cushions 20 which are provided with channels on their outer faces to fit snugly over the flanges 5 at the recessed areas. The channels may be somewhat narrower than the surfaces to which they are to be applied so that they will cling in position thereon. The rear faces of the adapters bear against the outer surface of the bumper. As the securing means is drawn up, the yielding bodies interposed between the bumper and the guard are pressed into close fitting relation to the opposing surfaces and adjust themselves to any variations in contour of the members. In Figs. 2 and 3, there is illustrated a condition which is common in the trade in which the variation in contour of the bumper and guard is absorbed by the distortion of the adapter under pressure of the securing means.

It will be noted that the body of the adapter is crescent shaped, that is, it is thicker at its midway point than at its ends, so that the rubber tapers as it approaches the ends of the adapter. The space between the arc shaped bumper and the arc shaped recess in the rear face of the guard is also crescent shaped but the variation in bumper curvatures creates substantial variations at the center. By having the compressible body of cresent shape it will fill out any space between the guard and the bumper with less distortion of the rubber body.

When the flanged guard is not employed, the adapter will be correspondingly changed, and other modifications will be suggested in actual commercial adaptations of the invention. The invention may be applied to vertical or triangular guards and to a wide variety of devices of this type.

What is claimed is:

1. An automobile bumper assembly comprising a main bumper and a guard mounted thereon, said guard being provided with a curved recess to fit approximately the curvature of the bumper, an arc-shaped rubber adapter to fit the recess and bear against the face of the bumper and having a channel on its convex side to receive a portion of the guard, and means to secure the guard and bumper together.

2. An automobile bumper assembly comprising a main bumper, a guard mounted thereon having rearwardly extending flanges, rubber strips each having a channel in the face thereof to be received over a flange, and means to secure the guard and bumper together to deform the strips to fit the contour of the bumper.

3. An automobile bumper assembly comprising a main bumper, a guard mounted thereon having rearwardly extending flanges, curved recesses in the flanges and rubber strips to fit the recesses each having a channel to receive a flange, and means to secure the guard and bumper together to deform the strips to fit the contour of the bumper.

4. The combination of a horizontal bumper for automobiles said bumper having a curved outer surface, a guard mounted on the bumper and having a rearwardly extending flange, a recess in the flange adapted to receive the bumper and a rubber strip having a channel in one face to receive the flange, and means to clamp the guard against the bumper and deform the strip.

5. An automobile bumper assembly comprising a bumper and a transverse guard mounted thereon, said guard having a rearwardly extending edge spaced from the outer surface of the bumper, a flexible and compressible adapter lying between the edge of the guard and the bumper and having a body portion of yieldable material constructed and adapted to be compressed to fill the space between the edge of the guard and the face of the bumper and an outstanding flange bearing against the side of said guard, and means to force the guard against the bumper to compress the adapter.

6. An automobile bumper assembly comprising a bumper having a curved outer surface and a transverse guard extending across the bumper, said guard having a face fitting approximately the outer surface of the bumper, a compressible and flexible adapter lying between the guard and the bumper and having a crescent shaped body of yieldable material filling the space between the bumper and the guard and a flange bearing against the side of the guard, and means to draw the guard against the bumper with sufficient force to compress the adapter.

7. An adapter for use with bumper and bumper guard assemblies wherein the horizontal bumper is formed with a curved outer face and the bumper guard is formed with a curved recess to fit approximately the curvature of the bumper, said adapter being suitable for mounting in the gap between said curved surfaces and consisting of a rubber body portion adapted to be compressed in assembling the elements and an upstanding flange portion adapted to bear against the side of the guard.

MERCER D. WALKLET.